US010908453B2

(12) United States Patent
Han et al.

(10) Patent No.: US 10,908,453 B2
(45) Date of Patent: Feb. 2, 2021

(54) DISPLAY DEVICE AND MANUFACTURING METHOD THEREOF

(71) Applicant: Samsung Display Co., Ltd., Yongin-si (KR)

(72) Inventors: Kang Soo Han, Seoul (KR); Yun Jong Yeo, Seoul (KR); Dong Uk Kim, Hwaseong-si (KR); Hyun Min Cho, Hwaseong-si (KR); Hyung Bin Cho, Seongnam-si (KR); Ji Hun Kim, Hwaseong-si (KR); Sung Won Cho, Hwaseong-si (KR); Young Min Kim, Asan-si (KR); Hae Il Park, Seoul (KR); Seung Jin Baek, Suwon-si (KR); Dae Young Lee, Seoul (KR); Kun Hee Jo, Yongin-si (KR); Gug Rae Jo, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 431 days.

(21) Appl. No.: 15/399,361

(22) Filed: Jan. 5, 2017

(65) Prior Publication Data

US 2017/0343855 A1 Nov. 30, 2017

(30) Foreign Application Priority Data

May 26, 2016 (KR) .................. 10-2016-0064523

(51) Int. Cl.
*G02F 1/1335* (2006.01)
*G02F 1/13357* (2006.01)

(52) U.S. Cl.
CPC .. *G02F 1/133536* (2013.01); *G02F 1/133528* (2013.01); *G02F 1/133617* (2013.01);
(Continued)

(58) Field of Classification Search
CPC .......... G02F 1/13394; G02F 1/133377; G02F 1/1341; G02F 1/133528; G02F 1/133536; G02F 1/133621; G02F 1/133617
See application file for complete search history.

(56) References Cited

U.S. PATENT DOCUMENTS 8,264,638 B2  9/2012 Jung et al.
8,525,958 B2  9/2013 Lee
(Continued)

FOREIGN PATENT DOCUMENTS

JP    2015-143723     8/2015
KR    10-2010-0090570  8/2010
(Continued)

OTHER PUBLICATIONS

European Search Reported dated May 8, 2017, in European Patent Application No. 17 15 5316.7.

*Primary Examiner* — Michael H Caley
*Assistant Examiner* — Agnes Dobrowolski
(74) *Attorney, Agent, or Firm* — H.C. Park & Associates, PLC

(57) ABSTRACT

A display device includes a first substrate, a first wavelength conversion layer and a second wavelength conversion layer disposed on the first substrate and spaced apart from each other, and a polarization layer disposed on the first wavelength conversion layer and the second wavelength conversion layer, the polarization layer including a reflection portion and a transmitting portion, in which the reflection portion overlaps a gap formed between the first wavelength conversion layer and the second wavelength conversion layer.

19 Claims, 13 Drawing Sheets

(52) U.S. Cl.
CPC ............... *G02F 1/133621* (2013.01); *G02F 2001/133548* (2013.01); *G02F 2001/133565* (2013.01); *G02F 2001/133614* (2013.01); *G02F 2201/121* (2013.01); *G02F 2202/108* (2013.01); *G02F 2202/36* (2013.01); *G02F 2203/05* (2013.01); *G02F 2203/34* (2013.01)

(56) References Cited

U.S. PATENT DOCUMENTS

| | | | |
|---|---|---|---|
| 9,274,371 | B2 | 3/2016 | Kaida et al. |
| 9,383,601 | B2 | 7/2016 | Lee et al. |
| 2008/0121612 | A1* | 5/2008 | Nam ................ B82Y 10/00 216/23 |
| 2013/0242228 | A1* | 9/2013 | Park ................ G02F 1/133377 349/61 |
| 2015/0062497 | A1 | 3/2015 | Nam et al. |
| 2015/0070624 | A1 | 3/2015 | Liu |
| 2015/0171268 | A1 | 6/2015 | Breen et al. |
| 2015/0185551 | A1 | 7/2015 | Kim et al. |
| 2015/0200520 | A1 | 7/2015 | Morita et al. |
| 2016/0033823 | A1 | 2/2016 | Lee et al. |
| 2016/0116799 | A1* | 4/2016 | Jang ................ G02F 1/133528 438/23 |
| 2016/0223870 | A1* | 8/2016 | Miki ................ G02F 1/133617 |

FOREIGN PATENT DOCUMENTS

| | | |
|---|---|---|
| KR | 10-2010-0111103 | 10/2010 |
| KR | 10-2015-0027931 | 3/2015 |
| KR | 10-2015-0080281 | 7/2015 |

\* cited by examiner

DISPLAY DEVICE AND MANUFACTURING METHOD THEREOF

CROSS-REFERENCE TO RELATED APPLICATION

This application claims priority from and the benefit of Korean Patent Application No. 10-2016-0064523, filed on May 26, 2016, which is hereby incorporated by reference for all purposes as if fully set forth herein.

BACKGROUND

Field

Exemplary embodiments relate to a display device and a manufacturing method thereof.

Discussion of the Background

The importance of a display device has increased with the development of multimedia. Accordingly, various types of display devices, such as a liquid crystal display (LCD) device, an organic light emitting display (OLED) device, and the like, are being used.

A liquid crystal display device, which may be one of the most widely used flat panel display devices, includes two substrates provided with field generating electrodes, such as a pixel electrode and a common electrode, and a liquid crystal layer disposed between the two substrates. An image may be displayed in the liquid crystal display device by applying a voltage to the field generating electrodes to generate an electric field in the liquid crystal layer, such that the direction of liquid crystal molecules in the liquid crystal layer is determined and the polarization of incident light is controlled.

A liquid crystal display device may utilize a light source as a light-receiving device. However, in this case, light loss may occur due to several overlapped functional layers, and more particularly, substantial amount of light loss may occur in a polarizing plate. Therefore, various technical attempts were made to reduce such light loss, and improve the characteristics of a display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device having an excellent color gamut.

Exemplary embodiment also provide a display device that may prevent occurrence of color interference between adjacent pixels.

Additional aspects will be set forth in the detailed description which follows, and, in part, will be apparent from the disclosure, or may be learned by practice of the inventive concept.

According to an exemplary embodiment of the present invention, a display device includes a first substrate, a first wavelength conversion layer and a second wavelength conversion layer disposed on the first substrate and spaced apart from each other, and a polarization layer disposed on the first wavelength conversion layer and the second wavelength conversion layer, the polarization layer including a reflection portion and a transmitting portion, in which the reflection portion overlaps a gap formed between the first wavelength conversion layer and the second wavelength conversion layer.

According to an exemplary embodiment of the present invention, a display device includes a first substrate, a first wavelength conversion layer and a second wavelength conversion layer disposed on the first substrate and spaced apart from each other, a first polarization layer disposed on the first wavelength conversion layer and the second wavelength conversion layer, the first polarization layer including a first reflection portion and a first transmitting portion, a second substrate facing the first substrate, and a second polarization layer disposed on the second substrate, in which the first reflection portion overlaps a gap formed between the first wavelength conversion layer and the second wavelength conversion layer.

According to an exemplary embodiment of the present invention, a method of manufacturing a display device includes providing a first substrate including a first wavelength conversion layer and a second wavelength conversion layer disposed adjacent to each other, forming a metal layer on the first wavelength conversion layer and the second wavelength conversion layer, forming a mask layer on the metal layer, patterning the mask layer by pressing the mask layer using a mask mold having a projection pattern, and patterning the metal layer using the patterned mask layer as a mask to form a polarization layer, the polarization layer including a reflection portion and a transmitting portion, in which patterning the mask layer includes pressing the mask mold using an elastic member.

According to an exemplary embodiment of the present invention, a method of manufacturing a display device includes providing a first substrate comprising a first wavelength conversion layer and a second wavelength conversion layer disposed adjacent to each other, forming a metal layer on the first wavelength conversion layer and the second wavelength conversion layer, forming a first mask layer and a second mask layer on the metal layer, patterning the second mask layer by pressing the second mask layer using a mask mold having a projection pattern, patterning the first mask layer using the patterned second mask layer as a mask and patterning the metal layer using the patterned first mask layer and second mask layer as a mask to form a polarization layer, the polarization layer including a reflection portion and a transmitting portion.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
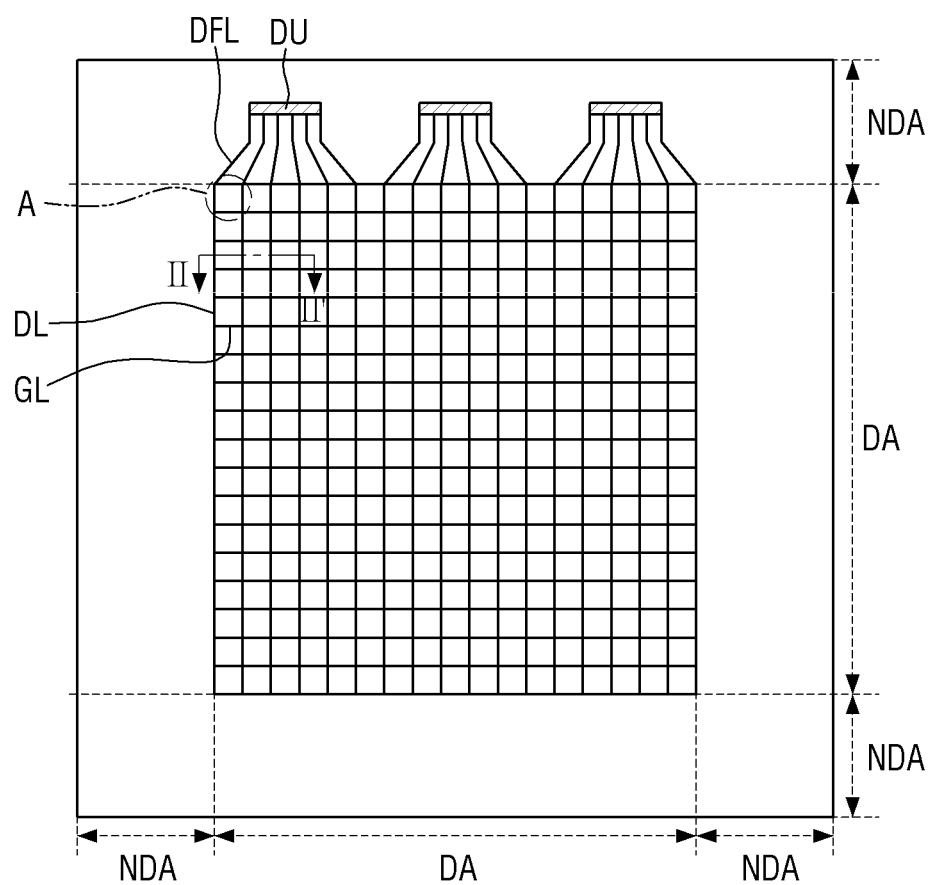
FIG. 1 is a layout diagram of a liquid crystal display device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
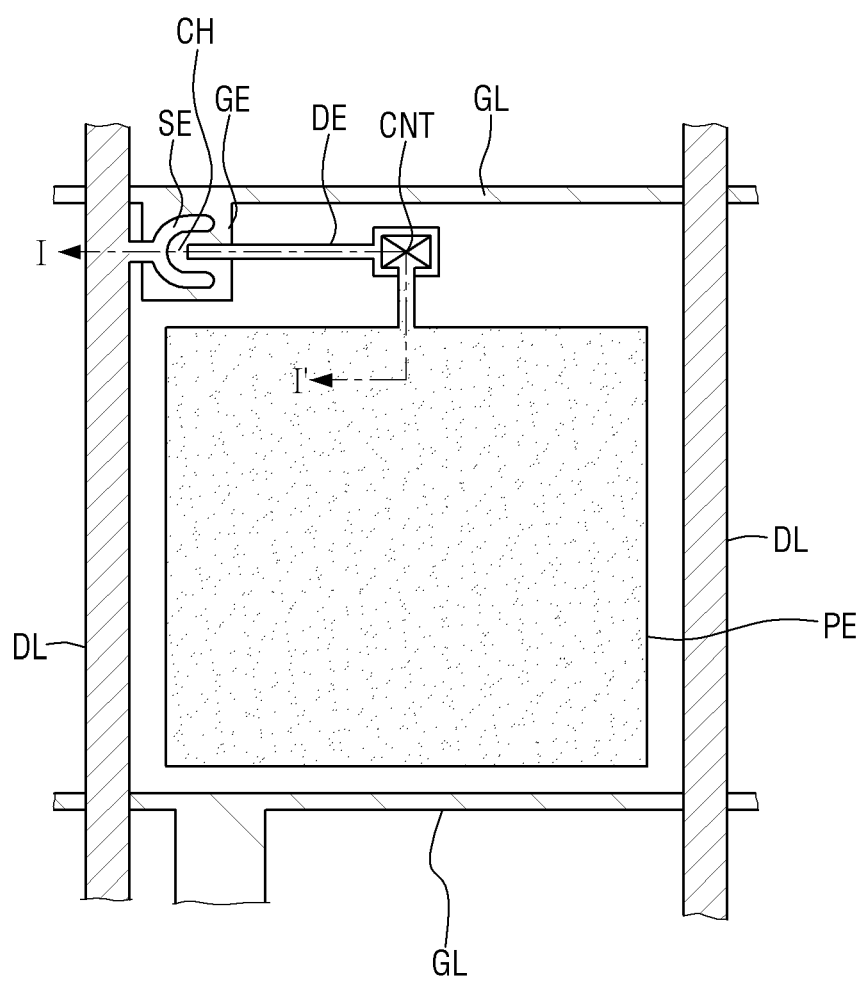
FIG. 2 is an enlarged view of portion 'A' of the liquid crystal display of FIG. 1.
Figure 3:
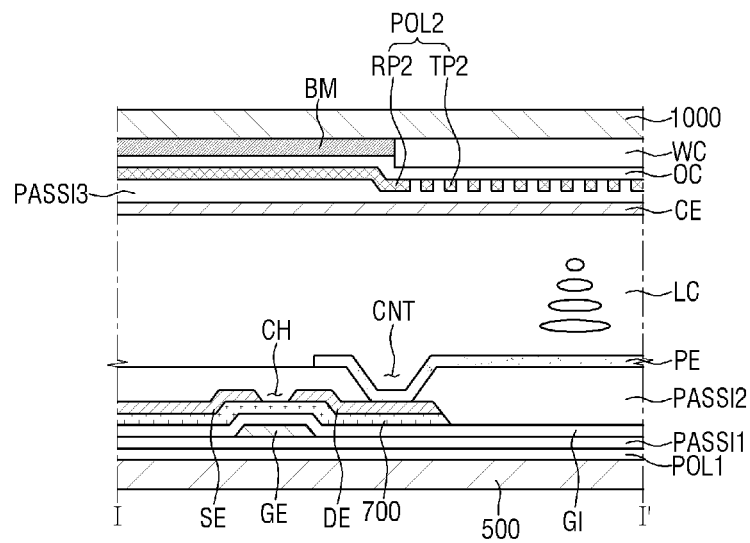
FIG. 3 is a cross-sectional view taken along line I-I' of FIG. 2.
Figure 4A:
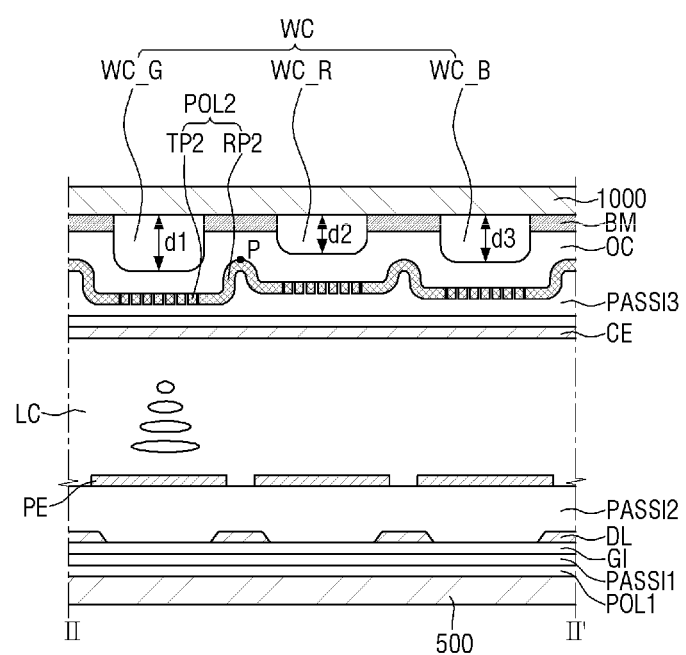
FIG. 4A is a cross-sectional view taken along line II-IF of FIG. 1.

FIG. 1 is a layout diagram of a liquid crystal display device according to an exemplary embodiment of the present invention. FIG. 2 is an enlarged view of region 'A' of the liquid crystal display device of FIG. 1. FIG. 3 is a cross-sectional view taken along line I-I' of FIG. 2. FIG. 4A is a cross-sectional view taken along line II-IF of FIG. 1.

Referring to FIGS. 1 to 4, the liquid crystal display device according to the present exemplary embodiment includes a first substrate, a first wavelength conversion layer and a second wavelength conversion layer disposed on the first substrate and spaced apart from each other, and a polarization layer disposed on the first wavelength conversion layer and the second wavelength conversion layer. The polarization layer includes a reflection portion and a transmitting portion.

A lower substrate 500 may include a material having heat resistance and transmissivity. For example, the lower substrate 500 may be made of transparent glass or plastic. A display area DA and a non-display area NDA may be defined on the lower substrate 500.

In the display device, the display area DA is an area on which an image is displayed, and the non-display area NDA is an area on which various signal lines for displaying an image are disposed. Data drivers DU and data fan-out lines DFL transmitting the signals received from the data drivers DU to data lines DL may be disposed on the non-display area NDA.

Pixels formed by the intersection of data lines DL and gate lines GL may be disposed on the display area DA. More particularly, FIG. 2 is an enlarged view of one pixel (portion 'A' of FIG. 1) of the pixels, and the display area DA may include a plurality of pixels having substantially the same structure.

A first polarization layer POL1 may be disposed on the lower substrate 500. The first polarization layer POL1 polarizes light emitted from a backlight unit BLU (not shown). Specifically, the first polarization layer POL1 transmits only light that vibrates in a specific direction, among light emitted from the backlight unit BLU, and absorbs or reflects the remaining light vibrating in different directions.

The first polarization layer POL1 may be a polarizing film including a polymer resin stretched in a specific direction and a light absorbing material that absorbs light vibrating in a specific direction. Alternatively, the first polarization layer POL1 may include a metal layer, and may absorb or reflect part of the light incident thereon and may transmit part of the light incident thereon. In addition, the first polarization layer POL1 may be a polarization layer including a wire grid polarizer (WGP). A detailed description thereof will be described later.

A first passivation film PASSI1 may be disposed on the first polarization layer POL1. The first passivation film PASSI1 may include an inorganic insulation material. For example, the first passivation film PASSI1 may include silicon oxide ($SiO_x$), silicon nitride ($SiN_x$), silicon oxynitride ($SiO_xN_y$), aluminum oxynitride ($AlO_xN_y$), titanium oxynitride ($TiO_xN_y$), zirconium oxynitride ($ZrO_xN_y$), hafnium oxynitride ($HfO_xN_y$), tantalum oxynitride ($TaN_xO_y$), or tungsten oxynitride ($WO_xN_y$).

A gate wiring (GL, GE) may be disposed on the first passivation film PASSI1. The gate wiring (GL, GE) may include a gate line GL receiving driving signals and a gate electrode GE protruding from the gate line GL. The gate line GL may extend in a first direction, which may be substantially the same as the x-axis direction of FIG. 2. The gate electrode GE may include three terminals of a thin-film transistor together with a source electrode SE and a drain electrode DE to be described later.

The gate wiring (GL, GE) may include at least one of an aluminum (Al)-based metal including an aluminum alloy, a silver (Ag)-based metal including a silver alloy, a copper (Cu)-based metal including a copper alloy, a molybdenum (Mo)-based metal including a molybdenum alloy, chromium (Cr), titanium (Ti), and tantalum (Ta). Alternatively, a metal or polymer material capable of realizing a desired display device may be used as the material of the gate wiring (GL, GE).

The gate wiring (GL, GE) may have a single-layer structure. The gate wiring (GL, GE) may alternatively have a double-layer structure, a triple-layer structure, or other multiple-layer structures.

A gate insulation film GI may be disposed on the gate wiring (GL, GE). The gate insulation film GI may cover the gate wiring (GL, GE), and may be disposed over the entire surface of the lower substrate 500. The gate insulation film GI may include at least one of inorganic insulation materials, such as silicon oxides ($SiO_x$) and silicon nitrides ($SiN_x$), and organic insulation materials, such as benzocyclobutene (BCB), acrylic materials, and polyimide.

A semiconductor pattern layer 700 may be disposed on the gate insulation film GI. The semiconductor pattern layer 700 may include amorphous silicon or polycrystalline silicon. However, the semiconductor pattern layer 700 may alternatively include oxide semiconductor.

The semiconductor pattern layer 700 may have various shapes, such as an island shape and a linear shape. When the semiconductor pattern layer 700 has a linear shape, the semiconductor pattern layer 700 may be disposed under the data line DL, and may be extended to the upper portion of the gate electrode GE.

In an exemplary embodiment, the semiconductor pattern layer 700 may be patterned to have a shape that is substantially the same as a shape of a data wiring (DL, SE, DE) over the entire area excluding a channel portion CH. More particularly, the semiconductor pattern layer 700 may be disposed to overlap the data wiring (DL, SE, DE) over the entire area excluding the channel portion CH.

The channel portion CH may be disposed between a source electrode SE and a drain electrode DE facing each other. The channel portion CH may electrically connect the source electrode SE and the drain electrode DE, and may have various shapes.

An ohmic contact layer (not shown) doped with n-type impurities may be disposed at the upper portion of the semiconductor pattern layer 700. The ohmic contact layer may overlap the entire or a part of the semiconductor pattern layer 700. When the semiconductor pattern layer 700 includes an oxide semiconductor, the ohmic contact layer may be omitted.

When the semiconductor pattern layer 700 is an oxide semiconductor layer, the semiconductor pattern layer 700 may include zinc oxide (ZnO). In addition, the semiconductor pattern layer 700 may be doped with at least one type of ions of gallium (Ga), indium (In), tin (Sn), zirconium (Zr), hafnium (Hf), cadmium (Cd), silver (Ag), copper (Cu), germanium (Ge), gadolinium (Gd), titanium (Ti), and vanadium (V). For example, the semiconductor pattern layer 700, which is an oxide semiconductor layer, may include at least one of ZnO, ZnGaO, ZnO, ZnSnO, GaInZnO, CdO, InO, GaO, ZnO, MgO, CuO, GeO, GdO, HfO, TiZnO, InGaZnO, and InTiZnO. The data wiring (DL, SE, DE) may be disposed on the semiconductor pattern layer 700. The data wiring (DL, SE, DE) includes a data line DL, a source electrode SE, and a drain electrode DE.

The data line DL may extend in a second direction, that is, y-axis direction of FIG. 2, so as to intersect the gate line GL. The source electrode SE may be branched off from the data line DL, and may be disposed to extend to the upper portion of the semiconductor pattern layer 700.

The drain electrode DE may be spaced apart from the source electrode SE, and may be disposed on the semiconductor pattern layer 700 and face the source electrode SE with the gate electrode GE or the channel portion CH therebetween. The drain electrode DE may contact a pixel electrode PE, which will be described later, so as to be electrically connected to the pixel electrode PE.

The data wiring (DL, SE, DE) may have a single-layer structure or a multiple-layer structure, which may include nickel (Ni), cobalt (Co), titanium (Ti), silver (Ag), copper (Cu), molybdenum (Mo), aluminum (Al), beryllium (Be), niobium (Nb), gold (Au), iron (Fe), selenium (Se), or tantalum (Ta). Further, an alloy including at least one of titanium (Ti), zirconium (Zr), tungsten (W), tantalum (Ta), niobium (Nb), platinum (Pt), hafnium (Hf), oxygen (O), and nitrogen (N) may be formed with the above metal.

FIG. 2 illustrates that one thin-film transistor is disposed in one pixel. It is contemplated that, however, a plurality of thin-film transistors may be disposed in one pixel. When thin-film transistors are disposed in one pixel, the pixel may be divided into a plurality of domains corresponding to each of the thin-film transistors.

A second passivation film PASSI2 may be disposed on the data wiring (DL, SE, DE) and the semiconductor pattern layer 700. The second passivation film PASSI2 may include an inorganic insulation material or an organic insulation material. The second passivation film PASSI2 may include a contact hole CNT exposing at least a part of the drain electrode DE.

A pixel electrode PE may be disposed on the second passivation film PASSI2. The pixel electrode PE may be electrically connected to the drain electrode DE through the contact hole CNT. In an exemplary embodiment, the pixel electrode PE may include a transparent conductor, such as indium tin oxide (ITO) or indium zinc oxide (IZO), or a reflective conductor, such as aluminum.

FIG. 2 illustrates that the pixel electrode PE has a plate shape. It is contemplated that, however, a pixel electrode may be a structure having one or more slits. Alternatively, one or more pixel electrodes may be disposed thereon, and, in this case, different voltages may be applied to the plurality of pixel electrodes.

An upper substrate 1000 may be disposed to face the lower substrate 500. The upper substrate 1000 may include a material having heat resistance and transmissivity. For example, the upper substrate 1000 may be made of transparent glass or plastic.

A black matrix BM and a plurality of wavelength conversion layers WC may be disposed on the upper substrate 1000. The black matrix BM may extend in the first direction to overlap the gate line GL, or may extend in the second direction to overlap the data line DL. Further, the black matrix BM may overlap the thin-film transistor.

The black matrix BM may block light from the outside or prevent spreading of light within the display device. To this end, the black matrix BM may include a photosensitive resin including black pigment. Alternatively, a material capable of blocking light from the outside may be included in the black matrix BM.

The wavelength conversion layer WC may be disposed on the portion of the upper substrate 1000, the portion of which may not be covered by the black matrix BM (e.g., the portion exposed by the black matrix BM). The wavelength conversion layer WC may convert the wavelength of light that has passed through a liquid crystal layer LC and a second polarization layer POL2, which will be described later. More particularly, the wavelength conversion layer WC converts the wavelength of light that has passed through the liquid crystal layer LC and the second polarization layer POL2, such that light passing through the wavelength conversion layer WC may have a specific color.

Referring to FIG. 4A, the wavelength conversion layer WC may include a green wavelength conversion layer WC_G, a red wavelength conversion layer WC_R, and a blue wavelength conversion layer WC_B, such that light passing therethrough may have a green color, a red color, and a blue color, respectively. More particularly, the wavelength conversion layer WC may include green, red, and blue color filters.

In the present exemplary embodiment, each of the wavelength conversion layers WC may include an upper end and a side wall inclined downward from the upper end.

The wavelength conversion layers WC may be arranged along a first direction and a second direction perpendicular to the first direction. More particularly, the wavelength conversion layers WC may be arranged in a matrix form having columns and rows. When pixels are arranged in the matrix form having columns and rows, the wavelength conversion layers WC may be disposed to correspond to the pixels. More particularly, the wavelength conversion layers WC may be disposed, such that at least one of the green, red, and blue wavelength conversion layers corresponds to one pixel.

The green wavelength conversion layer WC_G, the red wavelength conversion layer WC_R, and the blue wavelength conversion layer WC_B may be disposed adjacent to each other.

The green wavelength conversion layer WC_G and the red wavelength conversion layer WC_R may be disposed to be spaced apart from each other at a predetermined interval. More particularly, a gap may be disposed between the green wavelength conversion layer WC_G and the red wavelength conversion layer WC_R. Similarly, the red wavelength conversion layer WC_R and the blue wavelength conversion layer WC_B may be disposed to be spaced apart from each other at a predetermined interval. In this manner, a gap may also be formed between the red wavelength conversion layer WC_R and the blue wavelength conversion layer WC_B.

The black matrix BM may be disposed between the green wavelength conversion layer WC_G and the red wavelength conversion layer WC_R. More particularly, the black matrix BM may be disposed in the gap formed between the green wavelength conversion layer WC_G and the red wavelength conversion layer WC_R. Similarly, the black matrix BM may also be disposed between the red wavelength conversion layer WC_R and the blue wavelength conversion layer WC_B. As such, the black matrix BM may be disposed between the wavelength conversion layers WC.

The thicknesses of the wavelength conversion layers WC may be different from each other. For example, as shown in FIG. 4A, the thickness d1 of the green wavelength conversion layer WC_G, the thickness d2 of the red wavelength conversion layer WC_R, and the thickness d3 of the blue wavelength conversion layer WC_B are different from each other. In particular, the thickness d1 of the green wavelength conversion layer WC_G may be the largest, and the thickness d2 of the red wavelength conversion layer WC_R may be the smallest. The thickness difference may secure physical properties of the wavelength conversion layer WC to transmit light of a specific wavelength. That is, the thickness difference may adjust a wavelength of light that passes through the wavelength conversion layer WC, in order to emit light of a specific wavelength.

An overcoat film OC may be disposed on the wavelength conversion layers WC and the black matrix BM. The overcoat film OC may include an organic or inorganic insulation material. The overcoat film OC may be formed over the entire upper substrate 1000, and may function as a planarization film. FIG. 4A illustrates that the overcoat film OC is a single-layer film. It is contemplated that, however, the overcoat film OC may be a multiple-layer film or may be omitted.

A second polarization layer POL2 may be disposed on the overcoat film OC. The second polarization layer POL2 may polarize light provided from the backlight unit BLU and passes through the liquid crystal layer LC. Specifically, the second polarization layer POL2 may transmit only light that vibrates in a specific direction, among light that passes through the liquid crystal layer LC, and reflect the remaining light.

The vibration direction of the light transmitted through the second polarization layer POL2 may be the same as, or different from, the vibration direction of the light transmitted through the first polarization layer POL1. For example, when the first polarization layer POL1 transmits light vibrating in the first direction, the second polarization layer POL2 may transmit the light vibrating in the first direction, or in the second direction different from the first direction (for example, a direction perpendicular to the first direction).

The second polarization layer POL2 may include a reflection portion RP2 and a transmitting portion TP2. The reflection portion RP2 may reflect light incident thereto, and the transmitting portion TP2 may transmit a part of the light incident thereto and reflect another part of the light. That is, the polarization function of the second polarization layer POL2 may be performed by the transmitting portion TP2.

The transmitting portion TP2 may include a wire grid polarizer (WGP) for linearly polarizing light. Therefore, the transmitting portion TP2 may include fine metal wire patterns arranged in parallel to each other along one direction. Such fine metal wire patterns may have a line width of about 60 nm or less and a thickness of about 150 nm or less. However, the line width and the thickness may be varied according to the desired design. Among light incident onto the transmitting portion TP2, only the light incident in parallel to a fine metal wire pattern may pass through the transmitting portion TP2, and thus, the transmitting portion TP2 performs a polarizing function.

The transmitting portion TP2 may be disposed to overlap the wavelength conversion layer WC. When the transmitting portion TP2 overlaps the wavelength conversion layer WC, the light passing through the transmitting portion TP2 may have a specific color through the wavelength conversion layer WC. For example, when the light passing through the transmitting portion TP2 passes through the green wavelength conversion layer WC_G, a green color is expressed. Similarly, when the light that passed through the transmitting portion TP2 passes through the red wavelength conversion layer WC_R, a red color is expressed, and when the light passes through the blue wavelength conversion layer WC_B, a blue color is expressed.

The reflection portion RP2 may be disposed adjacent to the transmitting portion TP2. Specifically, when the transmitting portion TP2 is disposed to overlap the wavelength conversion layer WC, the reflection portion RP2 may be disposed between the adjacent transmitting portions TP2.

The reflection portion RP2 reflects light incident thereto. To this end, the transmitting portion TP2 may include a light-reflective material. The reflection portion RP2 may be disposed to overlap the gap formed between the adjacent wavelength conversion layers WC. In this case, when the black matrix BM is disposed between the adjacent wavelength conversion layers WC, the reflection portion RP2 may overlap the black matrix BM.

FIG. 4A illustrates that the reflection portion RP2 is disposed between the green wavelength conversion layer WC_G and the red wavelength conversion layer WC_R, or between the red wavelength conversion layer WC_R and the blue wavelength conversion layer WC_B. When the reflection portion RP2 is disposed between the green wavelength conversion layer WC_G and the red wavelength conversion layer WC_R, one end of the reflection portion RP2 may overlap the green wavelength conversion layer WC_G, and the other end of the reflection portion RP2 may overlap the red wavelength conversion layer WC_R. Similarly, when the reflection portion RP2 is disposed between the red wavelength conversion layer WC_R and the blue wavelength conversion layer WC_B, one end of the reflection portion RP2 may overlap the red wavelength conversion layer WC_R, and the other end of the reflection portion RP2 may overlap the blue wavelength conversion layer WC_B.

In this case, the distance from the upper substrate 1000 to one end of the reflection portion RP2 may be different from the distance from the upper substrate 1000 to the other end of the reflection portion RP2. This distance difference may be from the height difference between the wavelength conversion layers WC, as described above. For example, the distance from one end of the reflection portion RP2 overlapping the green wavelength conversion layer WC_G to the upper substrate 1000 may be greater than the distance from the other end of the reflection portion RP2 overlapping the red wavelength conversion layer WC_R.

Similarly, the distance from one end of the reflection portion RP2 overlapping the red wavelength conversion layer WC_R to the upper substrate 1000 may be less than the distance from the other end of the reflection portion RP2 overlapping the blue wavelength conversion layer WC_B. The reflection portion RP2 disposed to overlap the gap between the adjacent wavelength conversion layers WC may have a concave shape toward the upper substrate 100.

As used herein, among several points on the reflection portion RP2, the point having the shortest distance from the upper substrate 1000 may be referred to as a reference point P. In this case, the reference point P may be located between one end of the reflection portion RP2 and the other end thereof. Further, the reference point P may overlap the gap between the adjacent wavelength conversion layers WC, or may overlap the black matrix BM disposed in the gap.

The second polarization layer POL2 may include a high-reflectivity metal. For example, the second polarization layer POL2 may include at least one of aluminum, gold, silver, copper, chromium, iron, nickel, and molybdenum.

FIG. 4A illustrates that the second polarization layer POL2 has a single-layer structure. It is contemplated that, however, the second polarization layer POL2 may have a multiple-layer structure of two or more layers. In addition, FIG. 4A illustrates that the reflection portion RP2 and the transmitting portion TP2 include the same material by patterning the same metal layer. It is contemplated that, however, the reflection portion RP2 and the transmitting portion TP2 may include different materials from each other by different processes from each other.

As described above, when the transmitting portion TP2 is disposed to overlap the wavelength conversion layer WC, and the reflection portion RP2 is disposed between the wavelength conversion layers WC, light in a straight direction is transmitted, and the light inclined at a predetermined angle with respect to the straight direction is reflected by the reflection portion RP2, thereby preventing the occurrence of color interference between adjacent pixels over the entire display device. In particular, a display device according to exemplary embodiments may have an improved color gamut.

A third passivation film PASSI3 may be disposed on the second polarization layer POL2. The third passivation film PASSI3 may cover the transmitting portion TP2 and the reflection portion RP2, and may planarize the upper surface thereof.

A common electrode CE may be disposed on the third passivation film PASSI3. The common electrode CE may be a front electrode which is not patterned. A common voltage may be applied to the common electrode CE. When different voltages are applied to the common electrode CE and the pixel electrode PE, a predetermined electric field may be formed between the common electrode CE and the pixel electrode PE.

A liquid crystal layer LC, in which liquid crystal molecules are disposed, may be disposed between the upper substrate 1000 and the lower substrate 500. The liquid crystal layer LC may be controlled by the electric field formed between the common electrode CE and the pixel electrode PE. Further, light for displaying an image may be controlled by controlling the movement of liquid crystal molecules in the liquid crystal layer LC.

Hereinafter, a display device according to an exemplary embodiment of the present invention will be described. In the following exemplary embodiment, the same components as the previously described components are referred with the same reference numerals, and thus, repeated descriptions thereof will be omitted or simplified.

Figure 4B:
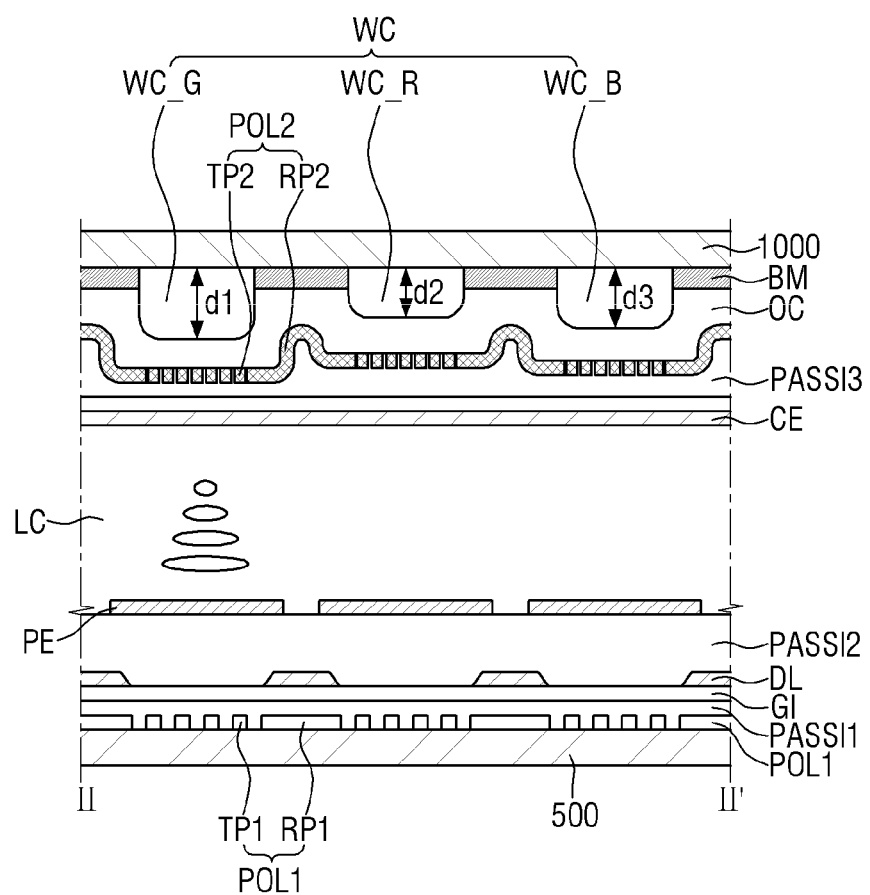
FIG. 4B is a cross-sectional view of a display device according to an exemplary embodiment of the present invention.

FIG. 4B is a cross-sectional view of a display device according to an exemplary embodiment of the present invention.

Referring to FIG. 4B, the display device according to the present exemplary embodiment is different from the display device illustrated with reference to FIG. 4A, in that a wire grid polarizer (WGP) is applied to the first polarization layer POL1.

In the present exemplary embodiment, the wire grid polarizer (WGP) may be disposed on the first polarization layer POL1, similarly to the second polarization layer POL2. In this case, the first polarization layer POL1 may include a reflection portion RP1 and a transmitting portion TP1.

The reflection portion RP1 may serve to reflect light incident thereto, and the transmitting portion TP1 may transmit a part of the incident light and reflect other part of the light. More particularly, when a wire grid polarizer (WGP) is disposed to the first polarization layer POL1, the polarization function of the first polarization layer POL1 may be performed by the transmitting portion TP1.

The transmitting portion TP1 may include the wire grid polarizer (WGP) for linearly polarizing light. Therefore, the transmitting portion TP1 may include fine metal wire patterns arranged in parallel to each other along one direction. Such fine metal wire patterns may have a line width of about 60 nm or less, and a thickness of about 150 nm or less. However, the line width and the thickness may be varied according to the desired design. Among light incident onto the transmitting portion TP1, only the light incident in parallel to a fine metal wire pattern may pass through the transmitting portion TP1, and thus, the transmitting portion TP1 performs a polarizing function. The transmitting portion TP1 of the first polarization layer POL1 may be disposed to overlap the pixel electrode PE disposed over the lower substrate 500. Further, the transmitting portion TP1 of the first polarization layer POL1 may be disposed to overlap the transmitting portion TP2 of the second polarization layer POL2 and the wavelength conversion layer WC disposed on the upper substrate 1000.

Accordingly, light provided from the backlight unit BLU (not shown) may be emitted to the outside of the display device through the transmitting portion TP1 of the first polarization layer POL1, the liquid crystal layer LC, the transmitting portion TP2 of the second polarization layer POL2, and the wavelength conversion layer WC.

The reflection portion RP1 may be disposed to be adjacent the transmitting portion TP1. Specifically, when the transmitting portion TP1 is disposed to correspond to the pixel electrode PE, the reflection portion RP1 may be disposed between the adjacent transmitting portions TP1. More particularly, the reflection portions RP1 and the transmitting portions TP1 may be arranged alternately with each other.

In the present exemplary embodiment, the reflection portion RP1 may be disposed to overlap the data line DL. That is, the reflection portion RP1 may extend along the data line DL. In this case, the reflection portion RP1 reflects the light proceeding in an inclined direction with respect to a straight direction, which may cause light leakage, thereby improving the characteristics of the display device. That is, the reflection portion RP1 of the first polarization layer POL1 may also serve as a light-blocking layer on the lower substrate 500.

Figure 5:
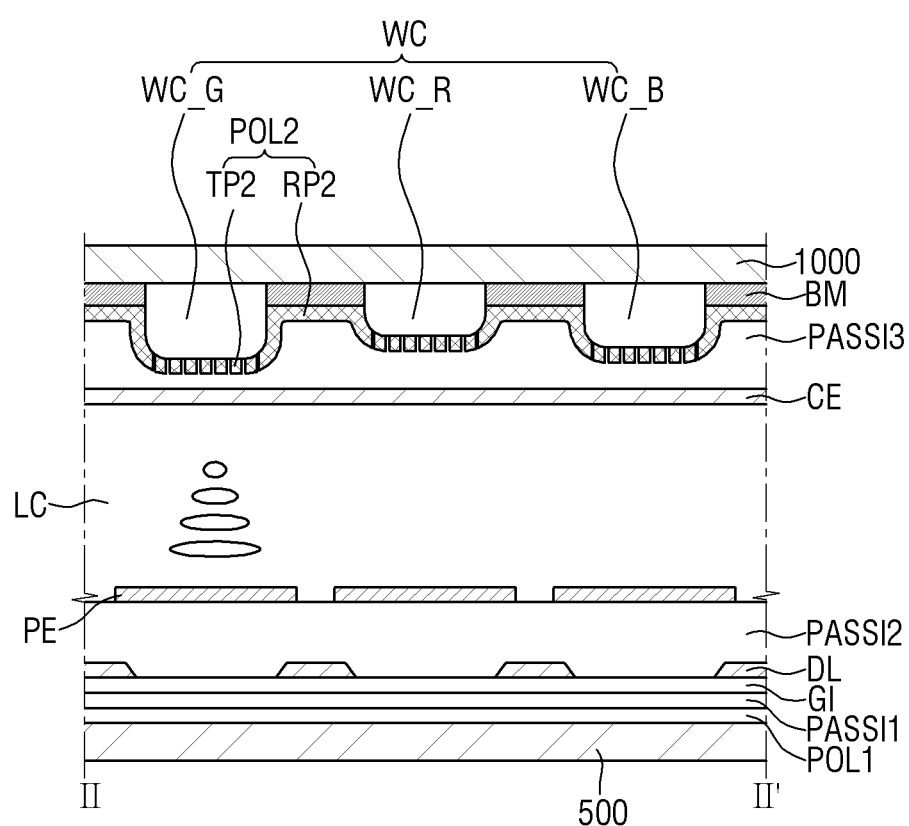
FIG. 5 is a cross-sectional view of a display device according to an exemplary embodiment of the present invention.

FIG. 5 is a cross-sectional view of a display device according to an exemplary embodiment of the present invention.

Referring to FIG. 5, the display device according to the present exemplary embodiment is different from the display device illustrated with reference to FIG. 4A, in that the overcoat film OC is not provided.

In the present exemplary embodiment, the overcoat film OC may not be provided. In this case, the second polarization layer POL may directly contact the wavelength conversion layer WC.

When the wavelength conversion layer WC has an upper end and a side wall, the transmitting portion TP2 may directly contact with the upper end of the wavelength conversion layer WC, and may overlap the wavelength conversion layer WC.

The reflection portion RP2 may be in contact with the side wall of the wavelength conversion layer WC. In particular, at least a part of the side wall of the wavelength conversion layer WC may be covered by the reflection portion RP2. In this manner, light proceeding in an inclined direction with respect to a straight direction may be reflected by the reflection portion RP2. That is, the light proceeding in the inclined direction with respect to the straight direction is blocked, thereby preventing occurrence of color interference when light passes through the wavelength conversion layer WC and is mixed with light passing through the adjacent wavelength conversion layer WC.

Figure 6:
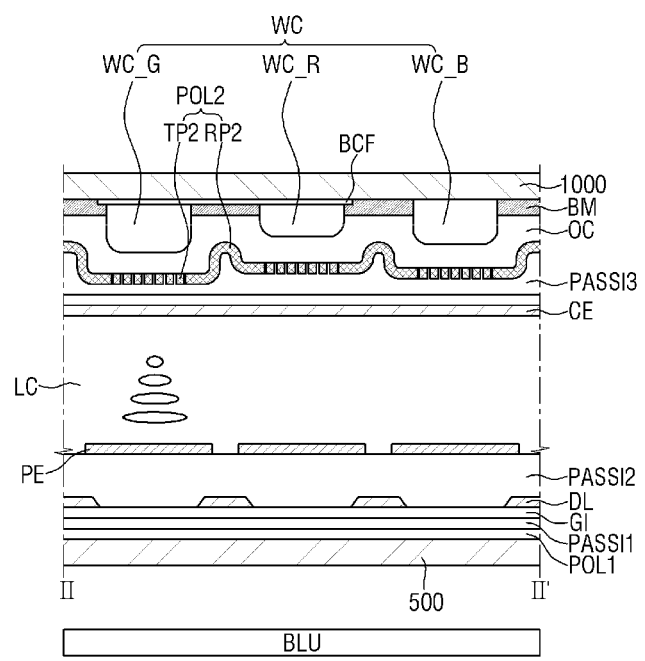
FIG. 6 is a cross-sectional view of a display device according to an exemplary embodiment of the present invention.

FIG. 6 is a cross-sectional view of a display device according to an exemplary embodiment of the present invention.

Referring to FIG. 6, the display device according to the present exemplary embodiment is different from the display device illustrated with reference to FIG. 4A, in that the wavelength conversion layer WC includes a quantum dot (QD).

In the present exemplary embodiment, the wavelength conversion layer WC may include a quantum dot. In this case, the quantum dot included in the wavelength conversion layer WC may be a II-VI based quantum dot including CdSe/ZnS, CdSe/CdS/ZnS, ZnSe/ZnS, or ZnTe/ZnSe. Alternatively, the quantum dot may be a III-V based quantum dot including InP/ZnS or a quantum dot including $CuInS_2/ZnS$.

When the wavelength conversion layer WC includes the quantum dot, the wavelength of light that passes through the wavelength conversion layer WC may be changed, depending on the size of the quantum dot. For example, each of the wavelength conversion layers WC may emit any one of green light, red light, and blue light.

More particularly, a green wavelength conversion layer WC_G, a red wavelength conversion layer WC_R, and a blue wavelength conversion layer WC_B may each include the quantum dot (not shown). It is contemplated that, however, the order of green, red, and blue wavelength conversion layers may be varied.

A backlight unit BLU may be disposed the lower substrate 500. The backlight unit BLU may provide light for driving the display device. The backlight unit BLU may be at least one of an edge type backlight unit provided with a light source at the lateral side thereof, and a direct type backlight unit provided with a light source at the upper side thereof.

The light source employed in the backlight unit BLU may be a light source emitting light in an ultraviolet wavelength range.

According to an exemplary embodiment of the present invention, in which the wavelength conversion layer WC includes the quantum dot, the backlight unit may emit light in a blue wavelength range. In this case, the blue wavelength conversion layer WC_B may be replaced by a light-transmitting layer.

The light-transmitting layer may include a transparent material, and may directly transmit light in the blue wavelength range, which is provided from the backlight unit BLU. In particular, the wavelength of light incident onto the light-transmitting layer may be substantially the same as the wavelength of the light passing through the light-transmitting layer. That is, the wavelength of the light passing through the light-transmitting layer may not be changed. Even though the light-transmitting layer transmits light without changing the wavelength thereof, light provided from the backlight unit BLU has a blue wavelength range, and thus, a blue color may be realized. The light-transmitting layer may include a transparent metal material. For example, the light-transmitting layer may include $TiO_2$.

When the backlight unit BLU emits light in the blue wavelength range, a blue light blocking filter BCF may be disposed between the green wavelength conversion layer WC_G and the upper substrate 1000, and/or between the red wavelength conversion layer WC_R and the upper substrate 1000. The blue light blocking filter BCF may block light in the blue wavelength range. In the case where the backlight unit BLU provides light in the blue wavelength range, the light in the blue wavelength range may remain even when the light passes through the wavelength conversion layer WC. However, in the case where the blue light blocking filter BCF is applied, the remaining light in the blue wavelength range is blocked by the blue light blocking filter BCF, and thus, the color of the light emitted from the wavelength conversion layer WC (in this case, green or red) will be clearer.

Figure 7:
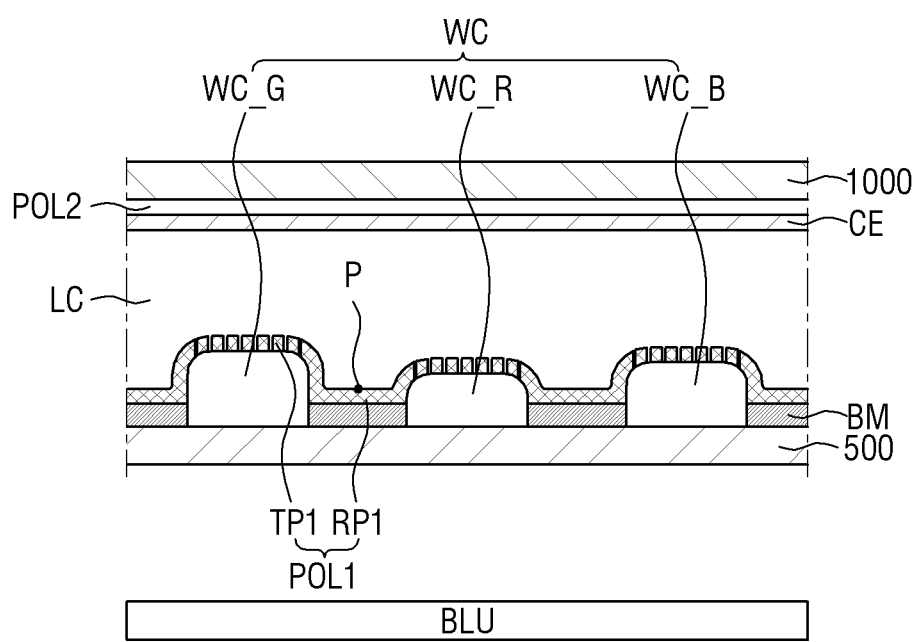
FIG. 7 is a cross-sectional view of a display device according to an exemplary embodiment of the present invention.

FIG. 7 is a cross-sectional view of a display device according to an exemplary embodiment of the present invention.

Referring to FIG. 7, the display device according to the present exemplary embodiment of the present invention is different from the display device illustrated with reference to FIG. 4A, in that the wavelength conversion layer WC is disposed on the lower substrate 500.

In the present exemplary embodiment, the wavelength conversion layer WC may be disposed on the lower substrate 500. More particularly, the display device according to the present exemplary embodiment may be a display device employing a Color filter On Array (COA) type.

Various electrodes, such as a gate electrode, a data wiring, and a pixel electrode may be arranged on the lower substrate 500. Various electrodes may be arranged as shown in FIG. 4, and the arrangement of various electrodes may be varied.

The wavelength conversion layer WC may be disposed on the lower substrate 500. The wavelength conversion layer WC may include a green wavelength conversion layer WC_G, a red wavelength conversion layer WC_R, and a blue wavelength conversion layer WC_B.

Multiple wavelength conversion layers WC may be disposed to be spaced apart from each other. In this manner, a gap may be formed between the adjacent wavelength conversion layers WC. A black matrix BM may be disposed in the gap. The black matrix BM may be substantially the same as that described with reference to FIG. 4A.

A first polarization layer POL1 may be disposed on the wavelength conversion layer WC. The first polarization layer POL1 may include a transmitting portion TP1 and a reflection portion RP1. The material of the transmitting portion TP1 and the material of the reflection portion RP1 are substantially the same as those described with reference to FIG. 4A.

The transmitting portion TP1 may be disposed to overlap the wavelength conversion layer WC. Thus, light provided from the backlight unit (BLU) may be transmitted to the liquid crystal layer LC through the transmitting portion TP1. The reflection portion RP1 may be disposed between the adjacent transmitting portions TP1. In particular, the reflection portion RP1 may be disposed between the adjacent wavelength conversion layers WC. In this manner, the reflection portion RP1 may be disposed to overlap the gap formed between one wavelength conversion layer WC and an adjacent wavelength conversion layer WC. One end of the reflection portion RP1 and the other end thereof may overlap the wavelength conversion layers WC.

More particularly, for example, in the reflection portion RP1 disposed between the green wavelength conversion layer WC_G and the red wavelength conversion layer WC_R, one end of the reflection portion RP1 may overlap the green wavelength conversion layer WC_G, and the other end of the reflection portion RP1 may overlap the red wavelength conversion layer WC_R.

Similarly, one end of the reflection portion RP1 disposed between the red wavelength conversion layer WC_R and the blue wavelength conversion layer WC_B may overlap the red wavelength conversion layer WC_R, and the other end thereof may overlap the blue wavelength conversion layer WC_B.

As used herein, among several points on the reflection portion RP1, a point having the shortest distance from the reflection portion RP1 to the upper substrate 1000 is defined as reference point P. A single reference point P or a plurality of reference points P may exist depending on the shape thereof. When multiple reference points P exist, points having the same distance are gathered to form a line.

The reference point P may be located between one end of the reflection portion RP1 and the other end thereof. In particular, the distance from one end of the reflection portion RP1 to the lower substrate 500 may be greater than the distance from the reference point p to the lower substrate 500. Similarly, the distance from the other end of the reflection portion RP1 to the lower substrate 500 may be greater than the distance from the reference point p to the lower substrate 500. Further, the distance from one end of the reflection portion RP1 to the lower substrate 500 may be different from the distance from the other end of the reflection portion RP1 to the lower substrate 500. For example, when one end of the reflection portion RP1 overlaps the green wavelength conversion layer WC_G and the other end of the reflection portion RP1 overlaps the red wavelength conversion layer WC_R, the distance between one end of the reflection portion RP1 and the lower substrate 500 may be greater than the other end of the reflection portion RP1 and the lower substrate 500. This configuration may be due to the height difference between the wavelength conversion layers WC, as described above.

Hereinafter, a method of manufacturing a display device according to exemplary embodiments will be described. Some of the components to be described hereinafter may be the same as those of the liquid crystal display described above, and thus, repeated description of the same components will be omitted.

FIGS. 8 to 13 are cross-sectional views for illustrating a method of manufacturing a display device according to an exemplary embodiment of the present invention.

Referring to FIGS. 8 to 13, the method of manufacturing a display device according to the present exemplary embodiment includes the steps of providing a first substrate including a first wavelength conversion layer and a second wavelength conversion layer disposed adjacent to each other, forming a metal layer on the first wavelength conversion layer and the second wavelength conversion layer, forming a mask layer on the metal layer, patterning the mask layer by pressing the mask layer using a mask mold having a projection pattern, and patterning the metal layer using the patterned mask layer as a mask to form a polarization layer including a reflection portion and a transmitting portion.

Figure 8:
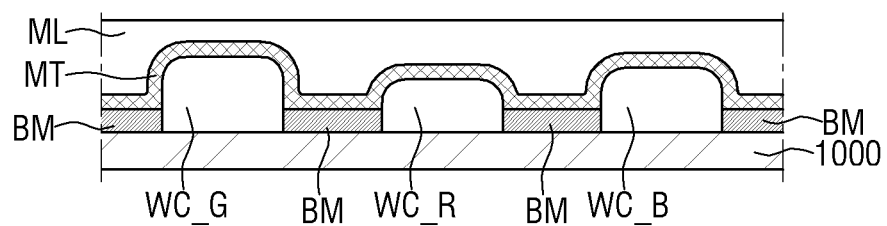
FIG. 8, FIG. 9, FIG. 10, FIG. 11, FIG. 12, and FIG. 13 are cross-sectional views for illustrating a method of manufacturing a display device according to an exemplary embodiment of the present invention.

Referring to FIG. 8, a first substrate 1000 including a plurality of wavelength conversion layers WC is provided. The first substrate 1000 may be the same as the upper substrate or the lower substrate described above.

A green wavelength conversion layer WC_G, a red wavelength conversion layer WC_R, and a blue wavelength conversion layer WC_B may be formed on the first substrate 1000. The plurality of wavelength conversion layers WC may be disposed to be spaced apart from each other at a predetermined interval. In this manner, a gap may be disposed between the adjacent wavelength conversion layers WC. The wavelength conversion layer WC may be formed by inkjet printing or chemical vapor deposition.

In an exemplary embodiment, the wavelength conversion layer WC may be a color filter (refer to FIG. 4A). The wavelength conversion layer WC may alternatively include a quantum dot (refer to FIG. 6).

The plurality of wavelength conversion layers WC may have heights different from each other. Specifically, the height of the green wavelength conversion layer WC_G may be the largest, and the height of the blue wavelength conversion layer WC_B may be the smallest. Since the heights may be substantially the same as those described with reference to FIG. 4A, repeated description thereof will be omitted.

A metal layer MT may be disposed on the wavelength conversion layers WC. The metal layer MT may be formed over the entire first substrate 1000. The metal layer MT may be formed by chemical vapor deposition or the like. The metal layer MT may include a high-reflectivity metal. For example, the metal layer MT may include at least one of aluminum, gold, silver, copper, chromium, iron, nickel, and molybdenum.

A mask layer ML may be disposed on the metal layer MT. The mask layer ML may be patterned to be formed into a mask for patterning the metal layer MT. The mask layer ML may include a resin, or alternatively, include silicon nitride or silicon oxide.

Figure 9:
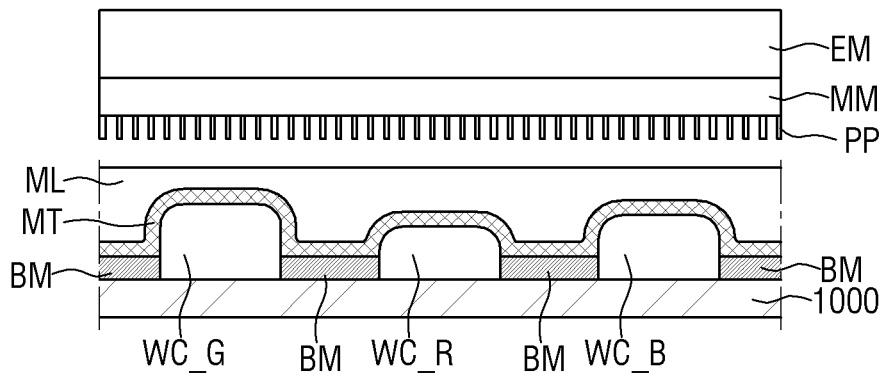
Figure 10:
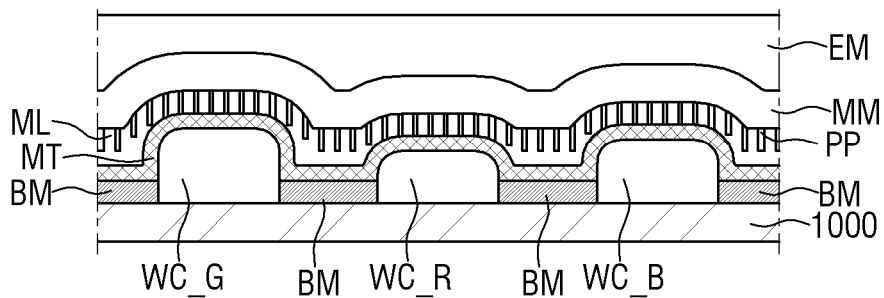
Figure 11:
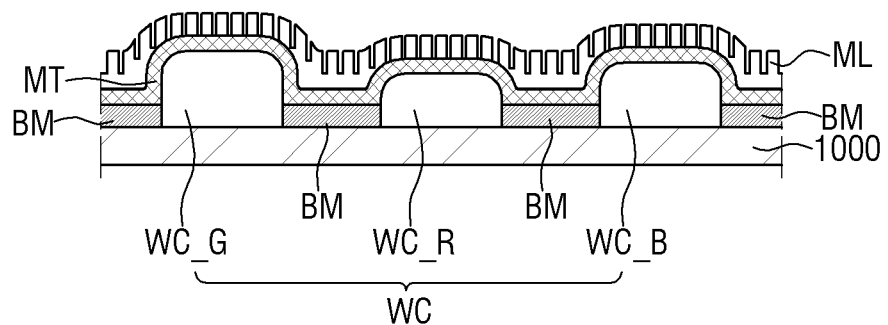

Subsequently, referring to FIGS. 9 and 10, the mask layer ML is patterned by pressing the mask layer ML using a mask mold having a projection pattern PP.

The mask mold MM may have a projection pattern PP. The mask layer ML may be patterned through the projection pattern PP by pressing the mask layer ML using the mask mold MM. To this end, the projection pattern PP may include an inverted pattern to form corresponding pattern on the mask layer ML.

The mask mold MM may descend to press the mask layer ML. The projection pattern PP of the mask mold MM may penetrate the mask layer ML. In this case, at least a part of the projection pattern PP may penetrate the mask layer ML and directly contact the wavelength conversion layer WC.

As described above, the heights of the wavelength conversion layers WC are different from each other. Therefore, when the mask layer ML is pressed by a rigid member, a pattern is not uniformly formed due to the height difference between wavelength conversion layers WC. However, when the mask mold MM is pressed by an elastic member EM, the pressure required over the entire area may be applied. In particular, the projection pattern PP may contact the wavelength conversion layer WC on which the projection pattern PP overlaps the wavelength conversion layer WC, regardless of the height of the wavelength conversion layer WC. Thus, a transmitting portion TP may be formed by the patterned mask layer ML, as will be described later.

When the mask mold MM is pressed by the elastic member EM, the distance from the end of the projection pattern PP to the substrate 1000 in the pressed state may be changed depending on position. Specifically, the distance from the end of the projection pattern PP overlapping the green wavelength conversion layer WC_G to the first substrate 1000 may be the largest, and the distance from the end of the projection pattern PP overlapping the red wavelength conversion layer WC_R to the first substrate 1000 may be the smallest.

In particular, the upper surface of the mask mold MM in the pressed state may not be uniformly even. That is, the level of the upper surface of the mask mold MM overlapping the green wavelength conversion layer WC_G may be the highest, and the level of the upper surface overlapping the red wavelength conversion layer WC_R may be the lowest.

Further, the thickness of the elastic member EM in the pressed state may be changed depending on position. The reason for this is that the applied pressure is changed depending on the position, as above described.

Specifically, the thickness of the elastic member EM overlapping the green wavelength conversion layer WC_G may be the thinnest, and the thickness of the elastic member EM overlapping the red wavelength conversion layer WC_R may be the thickest.

As such, when the mask layer ML is pressed by the mask mold MM, the mask layer ML may have a pattern corresponding to the projection pattern PP. More particular, the mask layer ML may have a pattern corresponding to that in the projection pattern PP (refer to FIG. 11).

Figure 12:
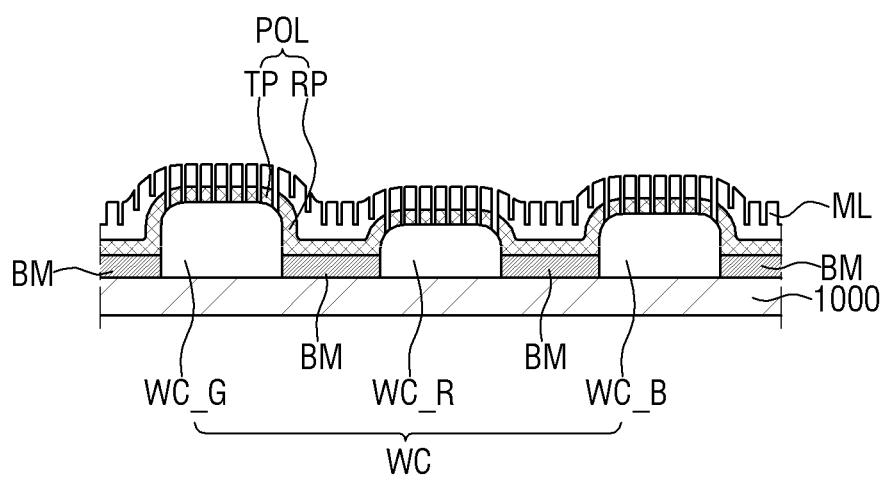

Subsequently, referring to FIG. 12, the metal layer MT is patterned by using the patterned mask layer ML as a mask, so as to form a polarization layer POL including a reflection portion RP and a transmitting portion TP.

As described above, when the projection pattern PP of the mask mold MM penetrates the mask layer ML, at least a part of the metal layer MT is exposed through the mask layer ML.

As such, when etching is performed by using the mask layer ML, a portion of the metal layer MT exposed by the mask layer ML is etched to be formed into a transmitting portion TP, and a portion of the metal layer MT not exposed by the mask layer ML is etched to be formed into a reflection portion RP. In particular, the portion of the metal layer MT exposed by the mask layer ML is disposed to overlap the wavelength conversion layer WC, and this portion is etched to be formed into a transmitting portion TP.

As the etching, dry etching or wet etching may be employed.

Figure 13:
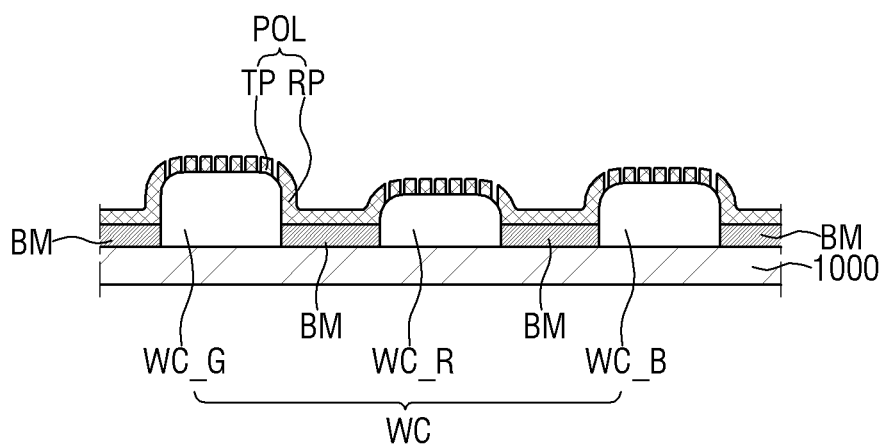

Subsequently, referring to FIG. 13, after etching is completed, the mask layer ML is removed. After the mask layer ML is removed, subsequent processes for manufacturing a display device may be carried out.

According to an exemplary embodiment of the present invention, a carrier film (not shown) may be attached onto the elastic member EM. The carrier film may include a rigid material. The carrier film may suppress the deformation of the elastic member EM. In this manner misalignment from excessive deformation of the elastic member EM may be prevented.

FIGS. 14 to 20 are cross-sectional views for illustrating a method of manufacturing a display device according to an exemplary embodiment of the present invention.

Referring to FIGS. 14 to 20, the method of manufacturing a display device according to the present exemplary embodiment includes the steps of providing a first substrate including a first wavelength conversion layer and a second wavelength conversion layer disposed adjacent to each other, forming a metal layer on the first wavelength conversion layer and the second wavelength conversion layer, forming a first mask layer and a second mask layer disposed on the first mask layer on the metal layer, patterning the second mask layer by pressing the second mask layer using a mask mold having a projection pattern PP, patterning the first mask layer using the patterned second mask layer as a mask, and patterning the metal layer using the patterned first mask layer and second mask layer as a mask to form a polarization layer including a reflection portion and a transmitting portion.

Figure 14:
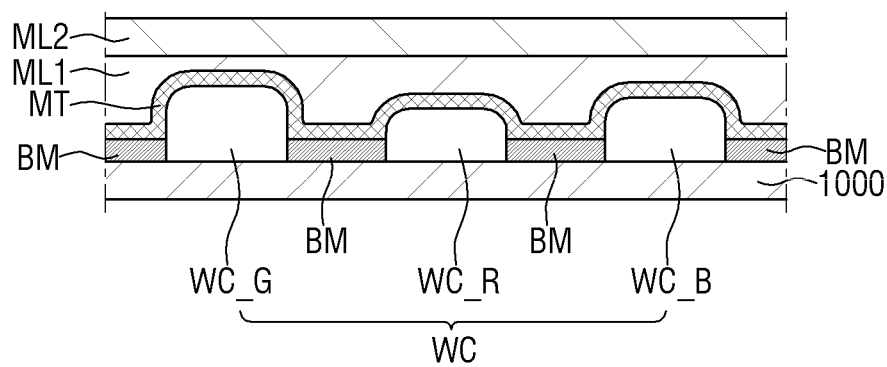
FIG. 14, FIG. 15, FIG. 16, FIG. 17, FIG. 18, FIG. 19, and FIG. 20 are cross-sectional views for illustrating a method of manufacturing a display device according to an exemplary embodiment of the present invention.

First, referring to FIG. 14, a first substrate 1000 including a first wavelength conversion layer and a second wavelength conversion layer disposed adjacent to each other are provided, and a metal layer MT is formed on the first wavelength conversion layer and the second wavelength conversion layer. These steps may be substantially the same as those described above with reference to FIG. 8. Therefore, detailed description thereof will be omitted.

Subsequently, a first mask layer ML1 and a second mask layer ML2 disposed on the first mask layer ML1 are formed on the metal layer MT. The second mask layer ML2 may include substantially the same material as the mask layer ML described with reference to FIG. 8. The first mask layer ML1 may include a different material from the second mask layer ML2. For example, the first mask layer ML1 may include a specific polymer material. The first mask layer ML1 and the second mask layer ML2 are different from each other in etching selectivity. The difference in etching selectivity may be utilized to form a more elaborate mask through two patterning processes, as will be described later.

Figure 15:
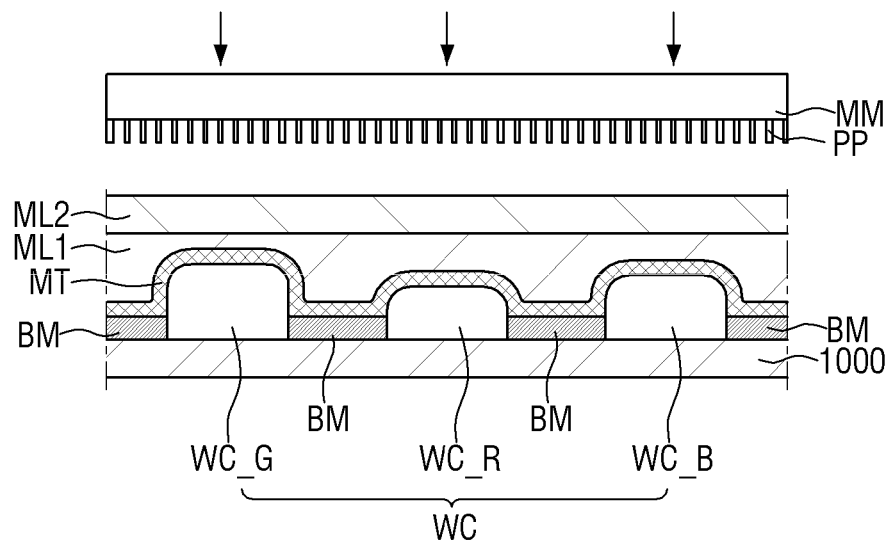
Figure 16:
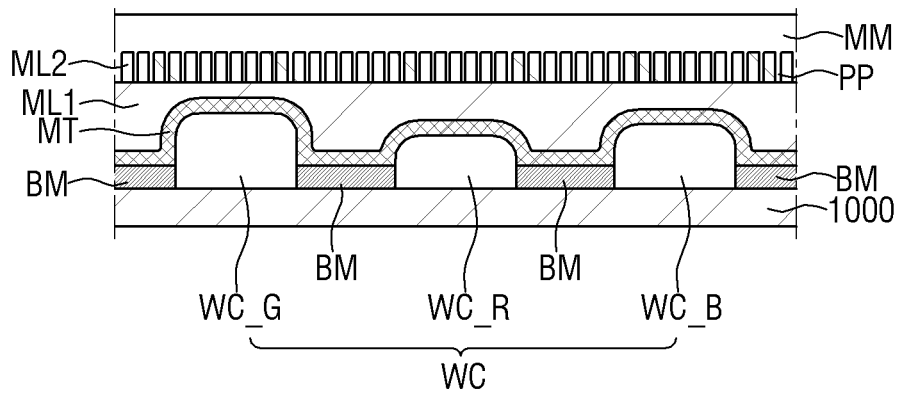
Figure 17:
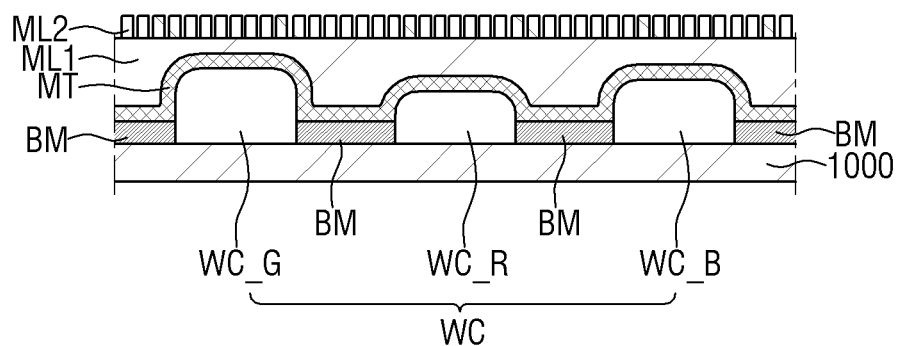

Referring to FIGS. 15 and 16, the second mask layer ML2 is patterned by pressing the second mask layer ML2 using a mask mold MM having a projection pattern PP.

The mask mold MM may have a projection pattern PP. The second mask layer ML2 may be patterned through the projection pattern PP by pressing the second mask layer ML2 using the mask mold MM. To this end, the projection pattern PP may include an inverted pattern to correspond to the pattern to be formed on the second mask layer ML2. The projection pattern PP of the mask mold MM may penetrate the second mask layer ML2. In this case, at least a part of the projection pattern PP may penetrate the second mask layer ML2 and directly contact the first mask layer ML1.

As such, when the second mask layer ML2 is pressed by the mask mold MM, the second mask layer ML2 may have a pattern corresponding to the projection pattern PP. That is, the second mask layer ML2 may have a pattern corresponding to the projection pattern PP (refer to FIG. 17).

Figure 18:
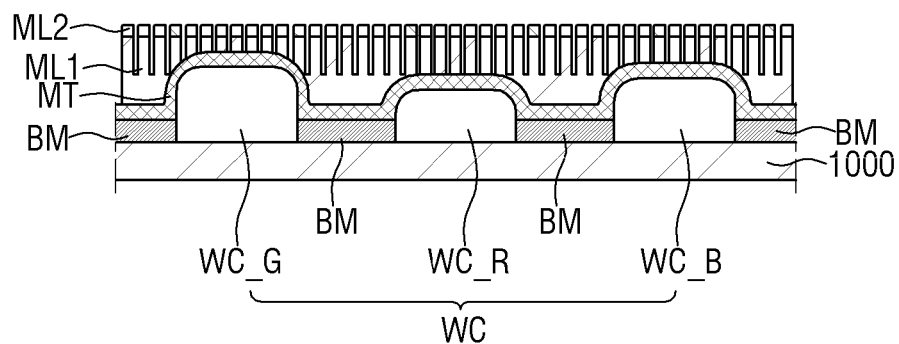

Subsequently, referring to FIG. 18, the first mask layer ML1 is patterned by using the patterned second mask layer ML2 as an etching mask.

The etching of the first mask layer ML1 may be performed by any one of drying etching and wet etching.

When the first mask layer ML1 is patterned by using the patterned second mask layer ML2 as an etching mask, the first mask layer ML1 may have a pattern that is substantially the same as that of the second mask layer ML2.

In this case, at least a part of the metal layer MT may be exposed through the first mask layer ML1.

Figure 19:
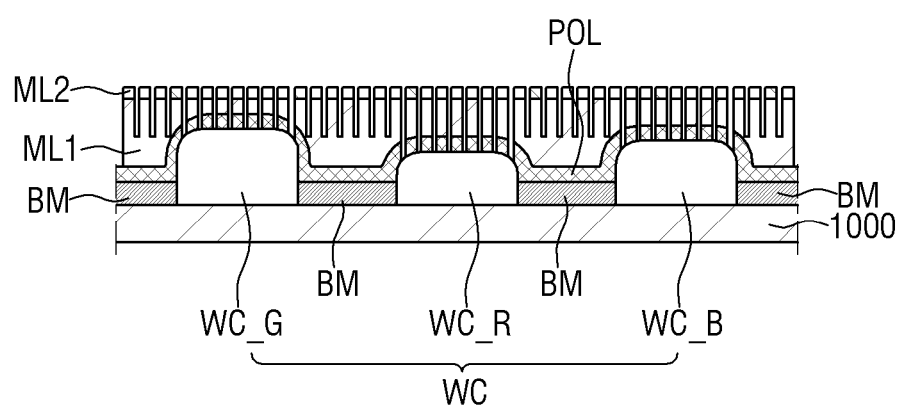

Subsequently, referring to FIG. 19, the metal layer MT is etched by using the first mask layer ML1 and the second mask layer ML2 as a mask, so as to form a polarization layer POL.

When the metal layer MT is etched by using the first mask layer ML1 and the second mask layer ML2 as a mask, a portion of the metal layer MT exposed by the first mask layer ML1 and the second mask layer ML2 may patterned to be formed into a transmitting portion TP, and other portion thereof may be formed into a reflection portion TP.

Since the positions of the transmitting portion TP and the reflection portion TP are substantially the same as those described above, a detailed description thereof will be omitted.

Figure 20:
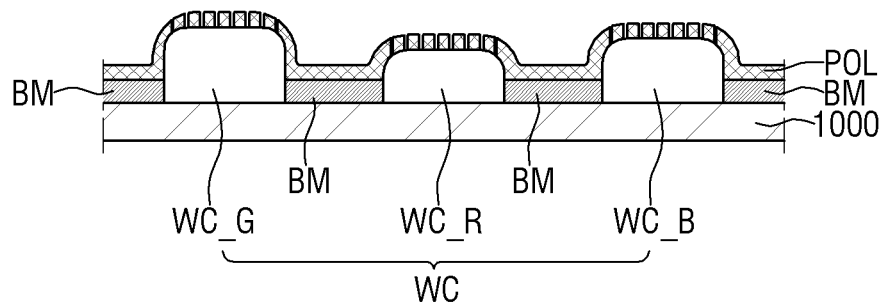

Subsequently, referring to FIG. 20, after etching the metal layer MT is completed, the first mask layer ML1 and the second mask layer ML2 may be removed. After the first mask layer ML1 and the second mask layer ML2 are removed, subsequent processes required for manufacturing a display device may be carried out.

As described above, according to exemplary embodiments of the present invention, the color gamut of a display device may be improved. In addition, color interference between adjacent pixels may be prevented, and thus, a display device may realize an improved display characteristics.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:
1. A display device, comprising:
a first substrate;

a first wavelength conversion layer and a second wavelength conversion layer disposed on the first substrate and spaced apart from each other;

a black matrix disposed between the first wavelength conversion layer and the second wavelength conversion layer, the black matrix being disposed directly on a surface of the first substrate;

an overcoat layer, which is disposed on the first substrate and fully covers the first wavelength conversion layer, the second wavelength conversion layer, and the black matrix; and a polarization layer disposed directly on an upper surface of the overcoat layer, the polarization layer comprising a reflection portion and a transmitting portion, wherein the reflection portion overlaps a gap formed between the first wavelength conversion layer and the second wavelength conversion layer, wherein the first wavelength conversion layer, the second wavelength conversion layer, and the black matrix are disposed between the first substrate and a lower surface of the overcoat layer facing the first substrate, wherein the transmitting portion includes a first portion overlapping the first wavelength conversion layer and a second portion overlapping the second wavelength convention layer, and wherein a distance between the first portion of the transmitting portion and the surface of the first substrate measured along a direction perpendicular to the surface of the first substrate is different from a distance between the second portion of the transmitting portion and the surface of the first substrate measured along the direction perpendicular to the surface of the first substrate.

2. The display device of claim 1, wherein the transmitting portion overlaps the first wavelength conversion layer and the second wavelength conversion layer.

3. The display device of claim 1, wherein a thickness of the first wavelength conversion layer is different from a thickness of the second wavelength conversion layer.

4. The display device of claim 1, wherein a first end of the reflection portion overlaps the first wavelength conversion layer and a second end of the reflection portion overlaps the second wavelength conversion layer.

5. The display device of claim 4, wherein a distance from the first end of the reflection portion to the first substrate is different from a distance from the second end of the reflection portion to the first substrate.

6. The display device of claim 1, wherein the reflection portion has a concave shape toward the first substrate.

7. The display device of claim 1, wherein:
the reflection portion comprises a reference point from which a distance to the first substrate is the shortest; and
the reference point is disposed between a first end and a second end of the reflection portion.

8. The display device of claim 1, further comprising:
a light transmitting layer disposed adjacent to the second wavelength conversion layer,
wherein the light transmitting layer is disposed between the lower surface of the overcoat layer and the first substrate.

9. The display device of claim 8, wherein heights of the first wavelength conversion layer, the second wavelength conversion layer, and the light transmitting layer are different from each other.

10. The display device of claim 9, wherein the first wavelength conversion layer is a green wavelength conversion layer and the second wavelength conversion layer is a red wavelength conversion layer.

11. The display device of claim 1, wherein each of the first wavelength conversion layer and the second wavelength conversion layer comprises a quantum dot.

12. The display device of claim 11, further comprising:
a backlight unit configured to provide blue light to the first substrate.

13. The display device of claim 12, further comprising:
a light-transmitting layer disposed adjacent to the second wavelength conversion layer,
wherein the light-transmitting layer is configured to transmit the blue light incident thereto and to emit the blue light, and
wherein the third wavelength conversion layer is disposed between the lower surface of the overcoat layer and the first substrate.

14. The display device of claim 13, further comprising:
a blue light blocking filter disposed between the first wavelength conversion layer and the first substrate, and between the second wavelength conversion layer and the first substrate.

15. A display device, comprising:
a first substrate;
a first wavelength conversion layer and a second wavelength conversion layer disposed on the first substrate and spaced apart from each other;
a black matrix disposed between the first wavelength conversion layer and the second wavelength conversion layer, the black matrix being disposed directly on a surface of the first substrate;
an overcoat layer, which is disposed on the first substrate and fully covers the first wavelength conversion layer, the second wavelength conversion layer, and the black matrix;
a first polarization layer disposed directly on an upper surface of the overcoat layer, the first polarization layer comprising a first reflection portion and a first transmitting portion;
a second substrate facing the first substrate; and
a second polarization layer disposed on the second substrate,
wherein the first reflection portion overlaps a gap formed between the first wavelength conversion layer and the second wavelength conversion layer,
wherein the first wavelength conversion layer, the second wavelength conversion layer, and the black matrix are disposed between the first substrate and a lower surface of the overcoat layer facing the first substrate,
wherein the first transmitting portion includes a first portion overlapping the first wavelength conversion layer and a second portion overlapping the second wavelength convention layer, and
wherein a distance between the first portion of the transmitting portion and the surface of the first substrate measured along a direction perpendicular to the surface of the first substrate is different from a distance between the second portion of the transmitting portion and the surface of the first substrate measured along the direction perpendicular to the surface of the first substrate.

16. The display device of claim 15, further comprising:
a common electrode disposed on the first polarization layer on the first substrate.

17. The display device of claim 15, wherein:
the second polarization layer comprises a second reflection portion and a second transmitting portion; and
the second transmitting portion overlaps the first wavelength conversion layer and the second wavelength conversion layer.

18. A display device, comprising:
a first substrate;
a first wavelength conversion layer and a second wavelength conversion layer disposed on the first substrate and spaced apart from each other;
a black matrix disposed between the first wavelength conversion layer and the second wavelength conversion layer, the black matrix being disposed directly on the first substrate;
an overcoat layer disposed on the first substrate and fully covering the first wavelength conversion layer, the second wavelength conversion layer, and the black matrix; and
a polarization layer disposed directly on an upper surface of the overcoat layer, the polarization layer comprising a reflection portion and a transmitting portion,
wherein the reflection portion overlaps a gap formed between the first wavelength conversion layer and the second wavelength conversion layer,
wherein the first wavelength conversion layer, the second wavelength conversion layer, and the black matrix are disposed between the first substrate and a lower surface of the overcoat layer facing the first substrate, and
wherein the transmitting portion includes a first portion overlapping the first wavelength conversion layer and a second portion overlapping the second wavelength convention layer, the first and second portions being disposed on different planes.

19. A display device, comprising:
a first substrate;
a first wavelength conversion layer and a second wavelength conversion layer disposed on the first substrate and spaced apart from each other;
a black matrix disposed between the first wavelength conversion layer and the second wavelength conversion layer, the black matrix being disposed directly on the first substrate;
an overcoat layer disposed on the first substrate and fully covering the first wavelength conversion layer, the second wavelength conversion layer, and the black matrix;
a first polarization layer disposed directly on an upper surface of the overcoat layer, the first polarization layer comprising a first reflection portion and a first transmitting portion;
a second substrate facing the first substrate; and
a second polarization layer disposed on the second substrate,
wherein the first reflection portion overlaps a gap formed between the first wavelength conversion layer and the second wavelength conversion layer,
wherein the first wavelength conversion layer, the second wavelength conversion layer, and the black matrix are disposed between the first substrate and a lower surface of the overcoat layer facing the first substrate, and
wherein the first transmitting portion includes a first portion overlapping the first wavelength conversion layer and a second portion overlapping the second wavelength convention layer, the first and second portions being disposed on different planes.

\* \* \* \* \*